INVENTORS.
ROBERT K. FUJITA &
HOWARD D. HOLE
BY
*Eyre, Mann & Lucas*
ATTORNEYS

United States Patent Office 3,199,946
Patented Aug. 10, 1965

3,199,946
REMOVAL OF HYDROGEN SULFIDE FROM
HYDROCARBON FUEL GASES
Robert K. Fujita, Honolulu, and Howard D. Hole, Kailua, Hawaii, assignors to Honolulu Gas Company, a corporation of Hawaii
Filed July 23, 1963, Ser. No. 297,058
13 Claims. (Cl. 23—3)

This application is a continuation-in-part of our earlier copending application Serial No. 43,741, filed July 19, 1960, and now abandoned.

This invention relates to a method of removing hydrogen sulfide from hydrocarbon fuel gases, using a new from of absorbent composition which gives remarkably superior and unexpected results.

The purification of industrial hydrocarbon fuel gases by removal of hydrogen sulfide therefrom has long preoccupied the art, some processes for such purpose dating back prior to the turn of this century. Since these first, early disclosures, the body of published literature which is pertinent to this field has grown very substantially and, today, there are literally hundreds of disclosed processes and improvements which are addressed to this purification problem.

The basic reason for so large and extensive an effort on the part of the prior art to develop new processes and improvements is essentially economical in character. Generally speaking, the margin of profit on the production and sale of hydrocarbon fuel gases, be they natural or manufactured, is quite small. Notwithstanding, the added cost of removing hydrogen sulfide and similar volatile sulfur compounds from these gases must be borne, as the presence of such sulfurous contaminants simply cannot be tolerated, for one reason or another, in virtually all fuel gas applications. Thus, any small increase in purification efficiency is of great importance when viewed in terms of the commercial costs of treating the hundreds of millions of cubic feet of hydrocarbon fuel gases which are processed annually, even though the advantage provided by a small improvement, standing alone, may not appear to be of much significance.

Of the large number and variety of disclosures concerning conventional purification processes, the greatest proportion relates to use of an iron compound such as iron oxide or iron hydroxide as the essential ingredient of absorbent compositions capable of absorbing sulfurous contaminants, and it is such compositions which in fact enjoy the most widespread commercial use today. There are some disclosures to use of other materials as essential active ingredients, but these are relatively few in number and have not been developed commercially to any appreciable extent.

Iron oxide or hydroxide is in abundant commercial supply and is quite efficient in the absorption of sulfurous contaminants from hydrocarbon fuel gases. Its principal shortcomings are, first of all, cost of manufacture from its parent element iron which makes a premium price necessary, or, if the user purchases iron and manufactures the oxide himself, then his own costs of operation are increased by the time and labor required for carrying out the oxidation. Secondly, while iron oxide-based absorbent compositions are fairly efficient, they have a somewhat limited operative life, being used to accumulate only about 40% and certainly not more than 50% by weight of sulfur therein. Finally, of the total amount of sulfurous contaminants which is absorbed by an iron oxide-based absorbent composition, only a certain proportion is converted to free, elemental sulfur when the composition is used at normal atmospheric temperatures. This means that some of the iron oxide is never liberated from chemical union with the absorbed sulfurous material and therefore is not available for accomplishing further absorption and purification. On the other hand, if the iron oxide is roasted at elevated temperatures to rid it of all sulfur, then the cost of purification is unavoidably increased by the attendant cost of roasting or calcination.

Quite unexpectedly, and more by fortuity than design, we have now discovered a new method of absorbing hydrogen sulfide and like sulfurous contaminants from hydrocarbon fuel gases which involves use of a particular absorbent composition under prescribed conditions and which achieves such remarkable and superior results as to be unprecedented over anything possible with heretofore known, conventional processes. More specifically, our new method is based on the use of an absorbent composition which is prepared by mixing together, as essential ingredients, finely-divided iron metal, moisture and a water soluble alkali metal carbonate, bicarbonate or hydroxide in an amount sufficient to establish a pH above 7.0, and preferably from about 9.0 to about 10.5, in the composition. In accordance with our invention, this composition is brought into contact with impure hydrocarbon fuel gases at normal, atmospheric temperatures and oxygen is periodically or continuously passed through the composition, at the same temperatures, to revivify and thereby counteract fouling of the composition as it absorbs sulfurous contaminants from the fuel gases.

Actual tests comparing the performance of the above-described composition with that of a similar composition containing iron oxide in place of iron metal have, to our complete surprise, demonstrated the following results. The iron metal composition initially accumulates about one and one-half as much and ultimately can be made to accumulate three times as much total sulfur as does the iron oxide composition. The iron metal composition is capable of converting about 98% or virtually all of the total absorbed sulfurous matter into the form of free, elemental sulfur, and this is almost twice the capability of conversion of the iron oxide composition. The iron metal composition, after successive periodic foulings, still retains about 78% of its original pH value, whereas the iron oxide composition retains only about 69% of its original pH value after the same number of foulings. The iron metal composition, when revivified with oxygen after fouling as just described, regains more than 94% of its original pH value, whereas the iron oxide composition, when revivified at the same time, regains only about 87% of its original pH value. This is a clear indication that the iron metal composition is much more capable of retaining a level of alkalinity which is necessary for effective purification of hydrocarbon fuel gases.

Such remarkable and unexpected superior effectiveness on the part of the iron metal composition may be summarized by the fact that the composition may be used for effective purification until about 75% by weight of free sulfur has accumulated therein. This figure exceeds any economical capability of the conventional iron oxide composition which in practice accumulates only about 40% and certainly not more than 50% by weight of sulfur. Such results signify an operative life and effectiveness for the iron metal composition three times that of the iron oxide composition and this is directly attributable to the use of iron instead of iron oxide which was in fact the only difference between the two compositions.

It is to be emphasized that, while the fact that the iron metal compositions of our invention can absorb more free sulfur for a longer period of time than known conventional compositions is the rather dramatic illustration of great commercial advantage, this is not the only benefit provided by our new method. Another significant advantage is that the method may be carried out at normal atmospheric temperatures of, say, up to about 100° F., in other words, ambient temperatures. Many conventional gas treatment methods require elevated temperatures of 250° F. or higher for effective purification and revivification, particularly if the maximum operative life of the absorbent composition is to be realized. In such processes, the cost of heat input required to attain the elevated temperatures is a very significant labor in the overall cost of operations. In our new method, none of these costs, nor those of preparation of iron compounds, is involved and in fact we are able to reduce costs of operation substantially because of the lower price of iron as compared to the premium price charged for iron compounds. The market price of iron oxide, for example, is about three times the price of iron. Our capability of absorbing up to three times as much sulfur with our new absorbent composition under these circumstances is all the more valuable.

It was, of course, completely unexpected that the mere use of iron metal instead of iron oxide would lead to such superior results. We have no present explanations that can conclusively account for the fact that the iron metal is so uniquely valuable as an essential ingredient of absorbent compositions formulated in accordance with the invention for the purpose of absorbing sulfurous matter from hydrocarbon fuel gases. However, whatever may be the true explanation, there can be no question about the fact that iron metal in absorbent compositions results in effective purification of hydrocarbon fuel gases on an unprecedented level of superiority.

The absorbent composition to be used in accordance with the invention is prepared as a mixture of solid ingredients, with added water, which is brought into contact with impure hydrocarbon fuel gases in any form of suitable vessel or container. Such a process is analagous to the well known, conventional dry-box purification techniques, using particular absorption "sponges."

It is necessary to prepare an absorbent composition which contains iron metal as an essential active ingredient. For this purpose any form of finely-divided iron metal such as filings, shot or powder may be used. We have achieved excellent results with iron powder having a particle size such that 90% of it passes through an 80 mesh Tyler sieve screen. This is a commercial grade of powdered iron which is readily available on the open market. The particle size of the iron need not be this small, so long as it is in a relatively fine state of subdivision. Generally speaking the particle size should not be larger than about 60 mesh Tyler sieve screen, so that the surface area of the iron in the absorbent composition is not excessively reduced or limited.

The amount of iron metal used in the absorbent composition should not be less than about one and one-half pounds for each cubic foot of the absorbent composition. There is no actual upper limit for the amount of iron. More than about eight pounds per cubic foot of the composition gives no special advantages and is ordinarily wasteful.

The foregoing stated amounts of iron in the absorbent composition are given for the case where the impure hydrocarbon fuel gases are to be passed through the absorbent composition at a flow rate of about 75 cubic feet per hour per cubic foot of absorbent composition. This flow rate is customarily used in many gas plants, but other flow rates are also employed. It will be understood, therefore, that where the flow rate of impure gas differs from 75 cubic feet per hour per cubic foot of absorbent composition, the foregoing stated minimum amount of iron is to be correspondingly increased or decreased to establish an equivalent minimum concentration of iron metal in the absorbent composition as regards the flow per unit time of fuel gas to be treated.

In addition to iron, it is essential that a particular alkaline material be included in the absorbent composition in an amount sufficient to give it a pH above 7.0, and preferably within the range from about 9.0 to about 10.05. The only alkalis which can be employed successfully in our new method are either alkali metal hydroxides, alkali metal carbonates or alkali metal bicarbonates. Of these classes of alkaline materials, we prefer to use the alkali metal carbonates, such as sodium or potassium carbonate. Alkaline earth metal carbonates or hydroxides are not of utility, the former because such carbonates are highly insoluble in water and incapable of giving the alkaline pH required, except perhaps in far too excessive amounts, and the latter because such alkaline earth hydroxides react with the carbon dioxide which is present in virtually all hydrocarbon fuel gases and form water insoluble carbonates which fill up the voids of the absorbent compositions and prevent flow of the fuel gases therethrough.

The amount of alkali to be used at a minimum should be enough to give the absorbent composition a pH above 7.0. Initially, we prefer to establish the pH of the absorbent composition within the range from about 9.0 to 10.5 and for this purpose we use about 1.4 to 2.2 pounds of alkali per cubic foot of absorbent composition. During contact with hydrocarbon fuel gases containing sulfurous contaminants, the pH of the absorbent composition will gradually decrease, and if the pH falls below 7.0, additional alkali will have to be added to raise the pH to the alkaline side.

Where the absorbent composition is to be used as a solid, particulate mixture, its principal ingredient as regards actual amounts preferably comprises an inert carrier for the essential active ingredients. The carrier may be any convenient form of solid cellulosic material customarily used in conventional gas purification processes, such as wood shavings or wood chips, which are inexpensive and which provide a porous absorbent composition with open voids through which the hydrocarbon fuel gases may pass readily. Other equivalent carrier materials which are inert towards the ingredients of the absorbent composition and the hydrocarbon fuel gases may also be employed in conventional manner.

It is recommended that the particle size of the inert carrier be relatively larger than those of the iron metal and alkaline salt particles, so that openings and voids of substantial size will be available throughout the life of the absorbent composition for the collection or accumulation of free sulfur therein. This will help to avoid a premature build up of excessive back pressure which tends to block flow of fuel gas through the absorbent composition. The inert carrier is also of advantage in helping to maintain the iron metal and alkaline salt uniformly distributed throughout the absorbent composition.

It is essential that water be both initially added to the absorbent composition and present during the use of the composition, to accomplish the removal of sulfurous matter from the hydrocarbon fuel gases in the effective manner of our process. We do not understand completely the reason for this requirement, but we believe that the chemical reactions taking place during use of the absorbent composition occur in and are promoted or accelerated by the presence of water which we apply to the surface of the iron metal particles and in which some of the alkaline salt is probably dissolved since it is water soluble. Liquid water is apparently some form of activator for our absorbent composition since use of the composition in the dry state or in the presence of water vapor only has not given satisfactory results. Thus, while its function is not actually known, we have determined that it is essential for water to be present during use of the new absorbent composition.

The amount of water used should not be less than about 10% nor more than about 75% based on the total weight of the absorbent composition. Less than about 10% by weight of water is not sufficient to activate the absorbent composition in the required manner and more than about 75% by weight of water cannot be adequately absorbed by the solid ingredients of the composition to prevent liquid water from accupying the open voids and spaces through which the impure fuel gas is to pass. When the composition is used as a solid particulate material, we prefer to mix therein approximately 20% to 40% water by weight and preferably such moisture level is maintained while the absorbent composition is used in contact with the hydrocarbon fuel gas stream. This preferred moisture level or any higher amount can be readily maintained by equipping the vessel in which the absorbent composition is contained with sprinklers or other means of adding water to the composition.

In addition to the essential ingredients iron metal, defined alkaline salt and water, the absorbent compositions of our invention must be subjected to the revivifying action of oxygen. In the absence of oxygen, the absorbent compositions become fouled and lose their capability of absorbing sulfurous matter from the hydrocarbon fuel gases. On revivification by contact with oxygen, the compositions rapidly regain up to about 90% of their original absorption capacities. It is a particularly valuable feature of our invention that the iron metal absorbent compositions may be effectively revivified at ordinary, atmospheric temperatures until about 75% of free sulfur has accumulated in the composition which far exceeds the capacity of any conventional composition that we have tested.

Revivification may be carried out either periodically or continuously. Where done periodically, the absorbent composition is used to purify fuel gases in the absence of any oxygen and when the purification capacity has fallen by about 50% or more, a flow of oxygen, or preferably air, is passed through the composition until such time as the composition regains up to about 90% of its original purification capacity.

In the continuous method of revivification, air is injected into the hydrocarbon fuel gas stream before it passes through the absorbent composition, and this being a simple and economical method is the one we prefer. The volume of air injected should not be less than about 2.5% of that of the fuel gas and preferably is about 5%. With the injection of air in this manner, the absorbent composition may be used continuously to purify hydrocarbon fuel gases until the end of its operative life when the large amount of accumulated free sulfur causes an excessive back pressure against further flow of gas.

When using the absorbent composition in the form of a particulate, solid mixture, the hydrocarbon fuel gases to be purified may be passed through a single vessel of absorbent composition or through a plurality of vessels connected in series. We prefer to use three vessels connected in series which are rotated or changed in position successively relative to the fuel gas entry line at predetermined intervals of time, preferably about every twelve hours. The schedule of rotation is that the vessel into which the fuel gas enters first is moved back to the second position, the second vessel to the third position, the third vessel to the first position and so on every twelve hours. When subjected to this schedule of rotation, the vessels will effectively remove hydrogen sulfide from fuel gases until the free sulfur formed in the absorbent composition constitutes up to about 60% of the weight thereof. At about this point, the absorbent composition becomes gradually caked and hard, with a loss of porosity so that additional fuel gas is blocked from passing through. With gas combining 500 grains of hydrogen sulfide per 100 cubic feet, this ordinarily takes place after about 25,000,000 cubic feet of fuel gas per 1,000 cubic feet of absorbent composition have been processed through each vessel. The effectiveness of the composition is readily renewed by removing the sulfur-laden, caked composition from each vessel and replacing about one-third of it with fresh absorbent composition. The old caked composition is broken up before the fresh material is added and the entire mixture returned to the vessel. This procedure is more than adequate for renewing the effectiveness of the composition for an efficient and economical period of time in plant operations and leads to concentrations of free sulfur as high as 75% by weight thereof. Of course, more or less of the sulfur-laden absorbent composition may be removed and replaced, if desired.

Preparation of the absorbent compositions used in accordance with our invention is readily accomplished in conventional equipment. We charge the inert carrier to a mixer or blender and then moisten it with the desired amount of water. Then, the finely-divided iron metal and alkaline salt are mixed in and the composition is immediately ready for use.

The process of our invention may be employed to purify any hydrocarbon fuel gas which is contaminated with hydrogen sulfide and similar volatile sulfurous materials. For example, fuel gases such as natural gas, manufactured oil gas, coal gas, propane, butane gas and the like may be treated in accordance with our method.

Further details of the invention will be understood by reference to the accompanying drawings of which:

Example 1

Four absorbent compositions were prepared to test the effectiveness of each in removing hydrogen sulfide from a hydrocarbon fuel gas, the test conditions being selected to simulate actual plant operations. The four test compositions were made up according to the following table, the amounts of ingredients being in grams:

| Ingredients | Absorbent Compositions | | | |
|---|---|---|---|---|
| | #1 | #2 | #3 | #4 |
| Wood shavings | 90 | 90 | 90 | 90 |
| Iron metal powder | 24 | 24 | | 24 |
| Iron oxide powder | | | 24 | |
| Calcium oxide | | 18 | | |
| Sodium carbonate | | | 18 | 18 |
| Water | 45 | 45 | 45 | 45 |

Each of the above test compositions was packed into a two-inch diameter glass tube to a depth of about seventeen inches. To simulate a flow rate of 150,000 cubic feet per hour of impure fuel gas in plant operations, a flow rate of 2¼ cubic feet per hour would have to be used through the test amounts of absorbent compositions #1–#4. However, in order to accelerate the test results, a flow rate of 5 cubic feet per hour of fuel gas was used for the first 70 cubic feet of flow through the test compositions and thereafter, for the remainder of the tests, a higher flow rate of 10 cubic feet per hour of fuel gas, simulating a plant flow rate of approximately 667,000 cubic feet per hour, was employed. The impure hydrocarbon fuel gas used in the tests was manufactured oil gas, taken from regular plant production, with an average hydrogen sulfide concentration of about 160 grains/100 cubic feet of gas.

The hydrogen sulfide concentration of the fuel gas exiting from each test composition was monitored, and when the concentration increased to 40%–50% of the original concentration, each test composition was revivified by passing air through it at a flow rate of 10 cubic feet per hour for a period of one hour. In the case of test compositions #3 and #4, the two revivifications carried out after 200 cubic feet of gas had been purified with each composition were accomplished by exposing the compositions to the atmosphere overnight. Water was added to all of the test compositions as required, on revivification, to maintain substantially the original level of water with which each composition was prepared. All purification and revivification operations with the four test compositions were conducted at ordinary atmospheric temperatures.

Figure 1:
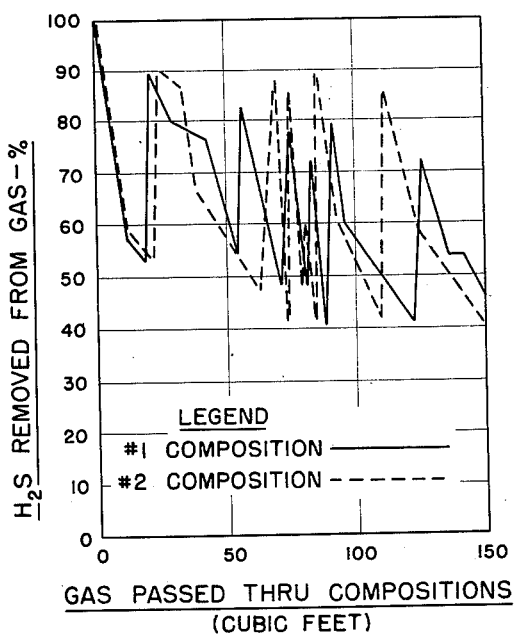
FIG. 1 is a graphical record of the prifying and revivification performance of two absorbent compositions containing iron metal.

Referring to FIG. 1 of the drawings, this is a record of the purification capability of absorbent compositions #1 and #2, based on iron metal powder without and with the alkali calcium oxide respectively, under the above-described test conditions. As will be noted, both of these compositions fouled very rapidly after the start of the tests, the purification capacity of each having dropped to almost 50% of the hydrogen sulfide concentration of the test oil gas after only about 20 cubic feet of the gas was passed through the compositions. On successive revivifications, composition #1 repeatedly lost its capability to regain its previous maximum purification capacities and, finally, at the sixth and last revivification, this composition could remove no more than 75% of the hydrogen sulfide concentration of the test gas. Composition #2 was somewhat more effective in regaining purification capacity on revivification, but this also began to fall off at the sixth and final revivification. Aside from the foregoing, the most serious deficiency of compositions #1 and #2 was that both compositions had to be revivified five times before 100 cubic feet of test gas had been treated, and six times by the time 125 cubic feet of test gas had been treated. These results so clearly demonstrated the virtual impossibility of using compositions #1 and #2 as effective absorbent compositions in practical plant operations that the tests were discontinued after 150 cubic feet of test gas had been treated.

Figure 2:
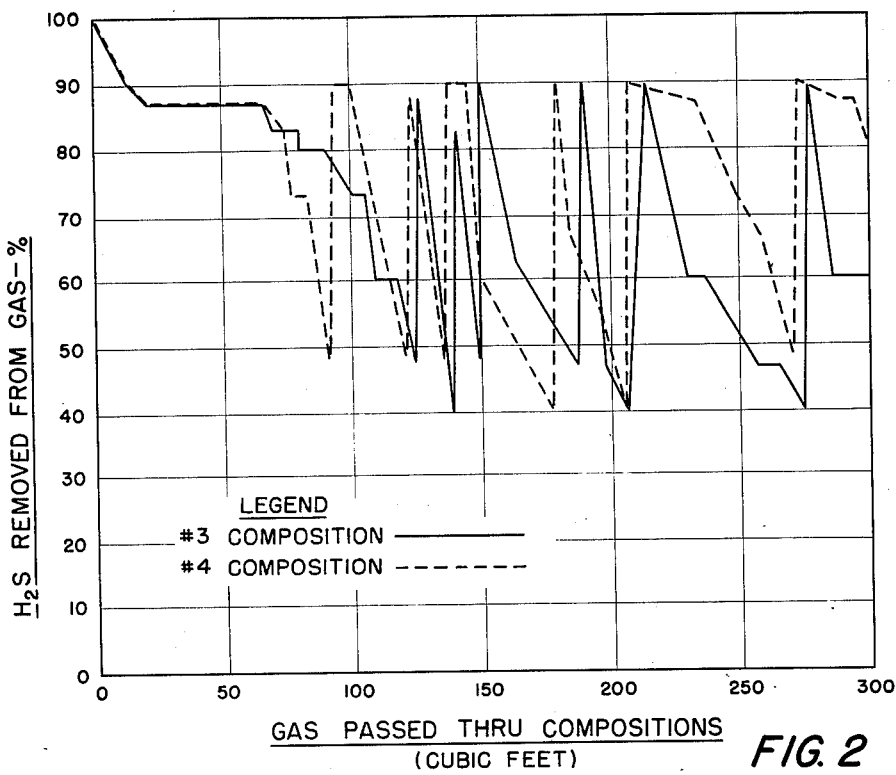
FIG. 2 is a graphical record similar to FIG. 1 relating to an iron oxide absorbent composition and to the absorbent composition used in the present invention.

Referring now to FIG. 2 of the drawings, this is a record of the purification results that were obtained with test absorbent compositions #3 and #4, composition #4 representing the process of our invention and composition #3 being similar except for the replacement of iron metal powder by iron oxide powder. First of all, comparing FIG. 2 with FIG. 1, it required six revivifications of compositions #1 and #2 to treat 150 cubic feet of test gas whereas the same number of revivifications made compositions #3 and #4 effective in the treatment of 300 cubic feet or twice as much of the test gas. Furthermore, on virtually each revivification, compositions #3 and #4 regained the capacity to remove 90% of the hydrogen sulfide concentration of the test gas and this could not be achieved with compositions #1 and #2. Thus, the marked inferiority of compositions #1 and #2 is evident from comparison of FIGS. 1 and 2.

With respect to the performance of compositions #3 and #4 shown in FIG. 2, it will be seen that at the outset these two compositions were approximately the same, with composition #4 as a matter of fact fouling slightly faster than composition #3. This tendency did not last long, however, and by the time 200 cubic feet of test gas had passed through each composition, both had been revivified four times. From this point on, composition #4 far exceeded composition #3 in the capability of retaining a higher purification capacity for hydrogen sulfide as shown by the slopes of the curves for each. While compositions #3 and #4 both could be revivified to the capacity to remove 90% of the total hydrogen sulfide concentration in the test gas after 200 cubic feet of test gas treatment, composition #3 very rapidly and drastically lost this capacity as signified by the very large negative slopes of the curve leading down from the revivification peaks for this composition. In contrast, the negative slopes of the composition #4 curve leading from the revivification peaks are much smaller, indicating that composition #4 could retain much more of its purification capacity for hydrogen sulfide over a longer period of time.

The curves for compositions #3 and #4 shown in FIG. 2 were supplemented by further data we obtained by chemical analyses. Following completion of the tests simulating plant operations, compositions #3 and #4 were analyzed for total sulfur content and for total free, elemental sulfur by the standard ASTM bomb and extraction (using carbon disulfide as the solvent) methods respectively. By ASTM bomb, it was found that the total sulfur content of composition #3 was 10.78% by weight of the composition while that of composition #4 was 14.24% on the same weight basis. Thus, composition #4 removed about 1.5 times as much total sulfur as did composition #3 on completion of our tests. By the method of extraction, it was found that the total free sulfur content of composition #3 was 8.45% by weight of the composition while that of composition #4 was 13.92% on the same weight basis. Thus, unexpectedly and of far more significance than the amounts of total sulfur content, the fact was that composition #4 was capable of converting 97.8% or virtually all of the total sulfur it had absorbed into the form of free, elemental sulfur whereas composition #3 could only convert 78.5% of the total sulfur absorbed into free sulfur. This is a positive indication of the superior effectiveness and efficiency of iron metal compositions such as test composition #4 since virtually all of the iron metal in such compositions remains available for achieving absorption of sulfurous matter throughout the period of use thereof. The operative life of such iron metal absorbent compositions is actually limited only because of the accumulation of large amounts of free, elemental sulfur which ultimately fills up the voids of the compositions and mechanically blocks further flow of impure hydrocarbon fuel gases therethrough.

The final set of data we determined with respect to the curves for compositions #3 and #4 relates to pH. Initially, the pH of both compositions was 10.2. After 270 cubic feet of test gas had been passed through each composition, the pH of composition #3 fell to 7.1 while that of composition #4 only to 7.9. Following the revivification of each composition shown at 270 cubic feet of test gas passed in FIG. 2, the pH of composition #3 increased to 8.9 while, on the other hand, the pH of composition #4 rose to 9.6. Thus, composition #4 was far more capable of retaining during purification and regaining on revivification its original level of alkalinity than composition #3, again a positive indication of the superiority of absorbent compositions containing finely-divided iron metal as an essential active ingredient.

All of the foregoing data and results, demonstrate beyond question that composition #4 was a surprisingly superior absorbent composition for hydrogen sulfide over any of the other test compositions.

*Example 2*

The tests described in Example 1 for test absorbent compositions #3 and #4 were continued and extended beyond treatment of 300 cubic feet of the impure manufactured oil gas in order to determine whether composition #4 would continue to give superior purification results not only while compositions #3 and #4 were fresh and new, but also after both compositions had aged in operational service to the point where they would ordinarily be considered no longer effective in plant operations. Accordingly, passage of the impure manufactured oil gas, containing about 160 grains of hydrogen sulfide per 100 cubic feet, through test compositions #3 and #4 was continued until 2050 cubic feet (including the 300 cubic feet of Example 1) of oil gas had been treated by each composition. Treatment of this volume of test gas represents 2730 hours or 113 days of service in a plant operation and simulates the purification of almost 410 million cubic feet of gas.

The extended tests to 2050 cubic feet of treated gas with compositions #3 and #4 were conducted on substantially the same basis as described in Example 1. The monitoring of gas exiting from each composition for hydrogen sulfide concentration, the revivifications of each composition, with addition of water and/or sodium carbonate as required, all as described in Example 1, were carried out throughout the extended period of tests and graphical records similar to those of FIGS. 1 and 2 were also maintained. Since such graphical records confirm the superiority of composition #4 shown in the record of FIG. 2, and are quite similar in appearance and nature to the latter, it would serve no useful purpose to reproduce them at length and in detail in additional drawings. The results of the extension of tests with compositions #3 and #4 to 2050 cubic feet of treated gas are adequately summarized by the following data. The sulfur contents in the table below are reported for both compositions #3 and #4 after 2050 cubic feet of impure oil gas had been passed through each. The number of revivifications and additions of sodium carbonate, as well as the amount of hydrogen sulfide removed by each composition, are reported for the period of time during which from 700 to 2050 cubic feet of impure oil gas was treated.

|  | Composition No. | |
| --- | --- | --- |
|  | #3 | #4 |
| Free Sulfur Content, Extraction, Percent wgt | 43.5 | 56.7 |
| Total Sulfur Content, Bomb, Percent wgt | 51.3 | 62.8 |
| Number of revivifications required | 10 | 4 |
| Number of additions of sodium carbonate required | 3 | 2 |
| Hydrogen sulfide removed, percent | 45 | 68 |

As will be seen, composition #4 continued to purify in a superior manner over the extended period of tests. Composition #4 accumulated more total and free sulfur than composition #3. Composition #3 had to be revivified 10 times, more than twice the number for composition #4 which required only 4 revivifications and yet removed more sulfur than composition #3. An equal amount of alkali had to be added to composition #3 one more time than to composition #4 to maintain an adequate level of alkalinity, demonstrating the greater capacity of composition #4 to retain its original alkalinity. Finally, composition #4 removed slightly over 1.5 times as much hydrogen sulfide from the impure oil gas than did composition #3.

The foregoing results again prove the superiority of iron metal absorbent compositions for hydrogen sulfide, this time over a period of service corresponding to commercial plant operations.

*Example 3*

6000 cubic feet of wood shavings were added to a dry mix blender. The shavings were moistened with 900 gal. of water and then 12,000 lbs. of powdered iron and 10,800 lbs. of sodium carbonate were added. The entire composition was thoroughly mixed and then divided into three equal parts of two thousand cubic feet each. Each of the one-third parts was placed in a separate vessel. The vessels were connected to each other in series with 16 inch pipes and were equipped with sprinklers through which water could be injected therein. The inlet port of the first vessel was connected to a 24 inch gas line. Manufactured oil gas having a hydrogen sulfide concentration of about 500 grains/100 cubic feet was continuously passed through the vessels. The oil gas contained 5% air by volume which had been previously injected into it. Initially and for twelve hours thereafter the hydrogen sulfide concentration of the oil gas discharged from the third vessel was less than 0.1 grain/100 cubic feet of oil gas. At the end of twelve hours the connections between the three vessels were changed such that the first vessel took the position of the second, the second vessel the position of the third and the third vessel the position of the first. The flow of oil gas was resumed and the hydrogen sulfide concentration of the gas leaving the third vessel was again less than 0.1 grain/100 cubic feet of oil gas. Processing of the oil gas in this manner with rotation of the vessels every twelve hours was continued for about two months during which time approximately 150,000,000 cubic feet of oil gas had been treated. At the end of about two months the free sulfur content of each of the vessels had reached about 60% based on the weight of the absorbent composition therein and this caused high back pressure against the flow of gas.

The vessels were opened and one-third of the contents of each was removed and replaced with fresh absorbent composition prepared in the same manner as was the initial composition. The mixtures of the used and fresh absorbent compositions were uniformly mixed and replaced in the vessels and efficient removal of hydrogen sulfide from the oil gas was resumed. When the absorbent compositions had to be removed from the vessels and reworked a second time, as just described, due to gradual caking and hardening, the free sulfur content of each of the vessels was higher than 70% by weight.

It will be understood that it is intended to cover all changes and modifications of the preferred embodiment of the invention herein chosen for the purpose of illustration which do not depart from the spirit and scope of the invention.

We claim:

1. A method of removing hydrogen sulfide from hydrocarbon fuel gas which comprises the steps of forming an admixture of finely-divided iron metal, an alkaline salt selected from the group consisting of alkali metal carbonates, alkali metal bicarbonates and alkali metal hydroxides, and from about 10% to about 75% by weight of water based on the total weight of said admixture, contacting said fuel gas with said admixture and exposing said admixture to oxygen, said method being carried out at ambient temperatures.

2. A method as in claim 1 in which said admixture is exposed to oxygen periodically.

3. A method as in claim 2 in which said admixture is exposed to oxygen at about the time when less than 50% of the hydrogen sulfide concentration of said fuel gas is the maximum amount of hydrogen sulfide that can be removed by said admixture.

4. A method as in claim 1 in which said admixture is exposed to oxygen continuously.

5. A method as in claim 4 in which said admixture is continuously exposed to oxygen by injecting at least 2.5% by volume of air into said fuel gas prior to the time that said fuel gas contacts said admixture.

6. A method as in claim 1 in which the amount of said finely-divided iron metal is at least about one and one-half pounds for each cubic foot of said admixture.

7. A method as in claim 1 in which said alkaline salt is present in an amount sufficient to give said admixture a pH within the range of from about 9.0 to 10.5.

8. A method as in claim 1 in which said admixture includes a particulate inert cellulosic carrier.

9. A method as in claim 1 in which said admixture includes from about 20% to about 40% by weight of water based on the total weight thereof.

10. A method of removing hydrogen sulfide from hydrocarbon fuel gas which comprises the steps of forming an admixture of finely-divided iron metal, an alkaline salt selected from the group consisting of alkali metal carbonates, alkali metal bicarbonates and alkali metal hydroxides, a particulate inert cellulosic carrier and from about 10% to about 75% by weight of water based on the total weight of said admixture, dividing said admixture into a plurality of substantially equal parts, placing said parts into a corresponding number of vessels connected to each other in series, passing the fuel gas through said vessels and exposing said admixture to oxygen, and changing the position of each of said vessels successively relative to the position of the vessel into which the fuel gas first enters at predetermined intervals of time, said method being carried out at ambient temperatures.

11. A method as in claim 10 in which the predetermined interval of time is about 12 hours.

12. A method as in claim 10 in which changing of the positions of the vessels is continued until about 60% by weight of free sulfur has accumulated in each vessel.

13. A method of removing hydrogen sulfide from hydrocarbon fuel gases which comprises steps of forming a mixture of finely-divided iron metal, an alkaline salt selected from the group consisting of alkali metal carbonates, alkali metal bicarbonates and alkali metal hydroxides, a particulate inert cellulosic carrier and from about 10% to about 75% by weight of water based on the total weight of said admixture, the amount of said alkaline salt being sufficient to give said admixture a pH within the range from about 9.0 to 10.5, dividing said admixture into a plurality of substantially equal parts, placing said parts into a corresponding number of vessels connected to each other in series, passing the fuel gas through said vessels and exposing said admixture to oxygen, changing the position of each of said vessels successively relative to the position of the vessel into which the fuel gas first enters at about 12 hour intervals, removing about one-third of the contents of each vessel when about 60% by weight of free sulfur has accumulated therein, replacing the one-third contents so removed with fresh amounts of said admixture and uniformly mixing the same with the remaining two-thirds contents, and resuming passage of fuel gas through said vessels and exposure of said admixture to oxygen, said method being carried out at ambient temperatures.

References Cited by the Examiner

UNITED STATES PATENTS

| | | | |
|---|---|---|---|
| 1,799,359 | 4/31 | Edmonds | 23—3.1 |
| 2,202,174 | 5/40 | Sullivan | 23—3.1 |
| 2,967,587 | 1/61 | Steding et al. | 23—3.1 |

FOREIGN PATENTS

| | | |
|---|---|---|
| 583,809 | 12/46 | Great Britain. |
| 673,546 | 6/52 | Great Britain. |

BENJAMIN HENKIN, *Primary Examiner.*

MAURICE A. BRINDISI, *Examiner.*

UNITED STATES PATENT OFFICE
CERTIFICATE OF CORRECTION

Patent No. 3,199,946

August 10, 1965

Robert K. Fujita et al.

It is hereby certified that error appears in the above numbered patent requiring correction and that the said Letters Patent should read as corrected below.

Column 3, line 11, for "labor" read -- factor --; column 4, line 2, for "10.05" read -- 10.5 --; column 5, line 2, for "accupying" read -- occupying --; column 6, line 23, for "prifying" read -- purifying --; line 68, the broken printed words should read -- each test --.

Signed and sealed this 7th day of June 1966.

(SEAL)
Attest:

ERNEST W. SWIDER
Attesting Officer

EDWARD J. BRENNER
Commissioner of Patents